(12) United States Patent
Funkhouser et al.

(10) Patent No.: US 11,359,128 B2
(45) Date of Patent: Jun. 14, 2022

(54) CEMENTING COMPOSITIONS AND METHODS

(71) Applicant: HALLIBURTON ENERGY SERVICES, INC., Houston, TX (US)

(72) Inventors: Gary P. Funkhouser, Roman Forest, TX (US); Paul Joseph Jones, Humble, TX (US); Greg Robert Hundt, Spring, TX (US)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 275 days.

(21) Appl. No.: 15/113,219

(22) PCT Filed: Feb. 21, 2014

(86) PCT No.: PCT/US2014/017572
§ 371 (c)(1),
(2) Date: Jul. 21, 2016

(87) PCT Pub. No.: WO2015/126408
PCT Pub. Date: Aug. 27, 2015

(65) Prior Publication Data
US 2017/0009122 A1   Jan. 12, 2017

(51) Int. Cl.
*C09K 8/44* (2006.01)
*C04B 26/14* (2006.01)
(Continued)

(52) U.S. Cl.
CPC .............. *C09K 8/44* (2013.01); *C04B 24/045* (2013.01); *C04B 24/121* (2013.01); *C04B 24/42* (2013.01);
(Continued)

(58) Field of Classification Search
CPC ....... C04B 24/121; C04B 24/42; C04B 26/14; C04B 24/003; C04B 24/045; C08K 5/17; C08K 5/5333; C08K 5/5357; C08K 5/5373; C09K 8/426; C09K 8/44; E21B 33/138; E21B 33/14; E21B 33/16; E21B 41/0035
See application file for complete search history.

(56) References Cited

U.S. PATENT DOCUMENTS 3,528,998 A   9/1970   Tesoro et al.
3,960,801 A   6/1976   Cole et al.
(Continued)

FOREIGN PATENT DOCUMENTS

AR   086458 A1   12/2013
CA   2935337 C   10/2018
(Continued)

OTHER PUBLICATIONS

Rocks, Jens et al.; "Curing kinetics and thermomechanical behaviour of co-anhydride cured aminoglycidyl epoxy resins"; Polym Int 52:1758-1766; Feb. 24, 2003.
(Continued)

*Primary Examiner* — Alicia Bland
(74) *Attorney, Agent, or Firm* — Polsinell PC

(57) ABSTRACT

Cementing compositions including a di- or poly epoxide resin, and amine hardener, and a di- or polyfunctional alkylphosphonate ester fortifier and methods of using the cementing compositions such as in a subterranean zone penetrated by a well bore.

14 Claims, 3 Drawing Sheets

(51) Int. Cl.

| | | |
|---|---|---|
| *C04B 24/04* | (2006.01) | |
| *C04B 24/12* | (2006.01) | |
| *C04B 24/42* | (2006.01) | |
| *C08K 5/17* | (2006.01) | |
| *C08K 5/5333* | (2006.01) | |
| *C08K 5/5357* | (2006.01) | |
| *C08K 5/5373* | (2006.01) | |
| *C09K 8/42* | (2006.01) | |
| *E21B 33/138* | (2006.01) | |
| *E21B 33/14* | (2006.01) | |
| *E21B 33/16* | (2006.01) | |
| *E21B 41/00* | (2006.01) | |

(52) U.S. Cl.
CPC ............... *C04B 26/14* (2013.01); *C08K 5/17* (2013.01); *C08K 5/5333* (2013.01); *C08K 5/5357* (2013.01); *C08K 5/5373* (2013.01); *C09K 8/426* (2013.01); *E21B 33/138* (2013.01); *E21B 33/14* (2013.01); *E21B 33/16* (2013.01); *E21B 41/0035* (2013.01)

(56) References Cited

U.S. PATENT DOCUMENTS

| | | | |
|---|---|---|---|
| 5,854,312 A | 12/1998 | Klippstein | |
| 5,919,844 A * | 7/1999 | Shimizu | C08K 5/521 |
| | | | 523/457 |
| 5,957,204 A | 9/1999 | Chatterji et al. | |
| 5,969,006 A * | 10/1999 | Onan | C09K 8/42 |
| | | | 523/166 |
| 6,244,344 B1 | 6/2001 | Chatterji et al. | |
| 6,330,917 B2 | 12/2001 | Chatterji et al. | |
| 6,712,153 B2 | 3/2004 | Turley et al. | |
| 6,887,574 B2 | 5/2005 | Dean et al. | |
| 6,887,950 B2 | 5/2005 | Timberlake et al. | |
| 7,131,493 B2 | 11/2006 | Eoff et al. | |
| 7,696,133 B2 | 4/2010 | Cowan | |
| 7,789,135 B2 | 9/2010 | Turley et al. | |
| 8,387,695 B1 | 3/2013 | Shanbhag | |
| 8,747,709 B2 * | 6/2014 | Brizius | C08H 6/00 |
| | | | 106/18.14 |
| 2001/0009133 A1 | 7/2001 | Chatterji et al. | |
| 2002/0022579 A1 | 2/2002 | Griffith et al. | |
| 2011/0114318 A1 | 5/2011 | Ezell et al. | |
| 2012/0012318 A1 | 1/2012 | Carelli et al. | |
| 2012/0329907 A1 | 12/2012 | Hong et al. | |
| 2012/0329908 A1 | 12/2012 | Chen et al. | |
| 2013/0008654 A1 * | 1/2013 | Deville | C09K 8/32 |
| | | | 166/295 |
| 2013/0105162 A1 * | 5/2013 | Abad | C04B 28/02 |
| | | | 166/295 |
| 2013/0143984 A1 * | 6/2013 | Henningsen | C08K 5/5373 |
| | | | 523/451 |
| 2013/0338266 A1 * | 12/2013 | Tomioka | C08J 5/24 |
| | | | 523/457 |

FOREIGN PATENT DOCUMENTS

| | | |
|---|---|---|
| EP | 0812883 A1 | 12/1997 |
| WO | 2013165425 A1 | 11/2013 |

OTHER PUBLICATIONS

Feild, R. B.; "Pyromellitic Dianhydride in Curing of Epoxy Resins", vol. 49, No. pp. 369-373; Mar. 3, 1957.

Kins, Christopher et al.; "New Phosphonate-Based Additives for Fortification in Model Epoxies", dx.doi.org/10.1021/ma400093w; Macromolecules 2013; vol. 46, pp. 2067-2077; 2013.

Calzia, K. J. et al.; "Comparing reinforcement strategies for epoxy networks using reactive and non-reactive fortifiers" J. Appl. Polym. Sci.; 102: 4606-4615; Dec. 2006.

Weichang, et al.; Understanding the decomposition and fire performance processes in phosphorus and nanomodified high performance epoxy resins and composites; Polymer, vol. 48, Issue 8, Feb. 14, 2007; pp. 2345-2354.

Cestari, AR et al.; "Cement-epoxy/water interfaces-energetic, thermodynamic, and kinetic parameters by means of heat-conduction microcalorimetry"; J Colloid Interface Sci. 343(1):162-7. doi: 10.1016/j.jcis.2009.11.017; Nov. 18, 2009.

International Search Report and Written Opinion; PCT Application No. PCT/US2014/017572; dated Nov. 21, 2014.

Examination Report; GCC Application No. 2015-28964; dated Sep. 3, 2019.

Examination Report; AR Application No. 20150100514, dated Oct. 22, 2020.

English Abstract of AR 086458A1; Retrieved from www.espacenet.com on Apr. 2, 2021.

\* cited by examiner

CEMENTING COMPOSITIONS AND METHODS

CROSS-REFERENCE TO RELATED APPLICATIONS

This application is a national stage entry of PCT/US2014/017572 filed Feb. 21, 2014, said application is expressly incorporated herein in its entirety.

FIELD

The present disclosure relates to cementing compositions comprising a di- or polyepoxide resin, an amine hardener, and a di- or polyfunctional alkylphosphonate ester fortifier; and to methods of using the cementing compositions, for example, in a subterranean zone penetrated by a well bore.

BACKGROUND

Cement compositions are commonly used in subterranean well construction and remedial operations. For example, cement compositions are used in primary cementing operations whereby pipe strings such as casings and liners are cemented in well bores. In performing primary cementing, a cement composition is pumped into the annular space between the walls of a well bore and the exterior surfaces of a pipe string disposed therein. The cement composition is permitted to set in the annular space forming an annular sheath of hard substantially impermeable cement therein. The cement sheath physically supports and positions the pipe string in the well bore and bonds the exterior surfaces of the pipe string to the walls of the well bore, whereby the undesirable migration of fluids between zones or formations penetrated by the well bore is prevented.

Multi-lateral wells have been developed which include vertical or deviated principal well bores having one or more ancillary laterally extending well bores connected thereto. Drilling and completion equipment is available which allows multiple-laterals to be drilled from a principal cased and cemented well bore. Each of the lateral well bores can include a liner cemented therein which is tied into the principal well bore. Other examples of well cement applications include, but are not limited to, cemented multi-lateral junctions; kick-off or whipstock plugs that are placed in a well bore to deflect the drill bit of a drill string and start directional drilling; cement plugs set on top of mechanical bridge plugs used to shut-off lower zones; plugs set in well bores to seal the well bores when the wells are abandoned; and in remedial applications, such as squeeze cementing, where a cement composition is placed with sufficient pressure into cracks, holes or other openings in casings or liners, cement sheaths sealing the liners in the well bore, or the like.

BRIEF DESCRIPTION OF THE DRAWINGS

Implementations of the present technology will now be described, by way of example only, with reference to the attached figures, wherein.

DETAILED DESCRIPTION

Figure 1:
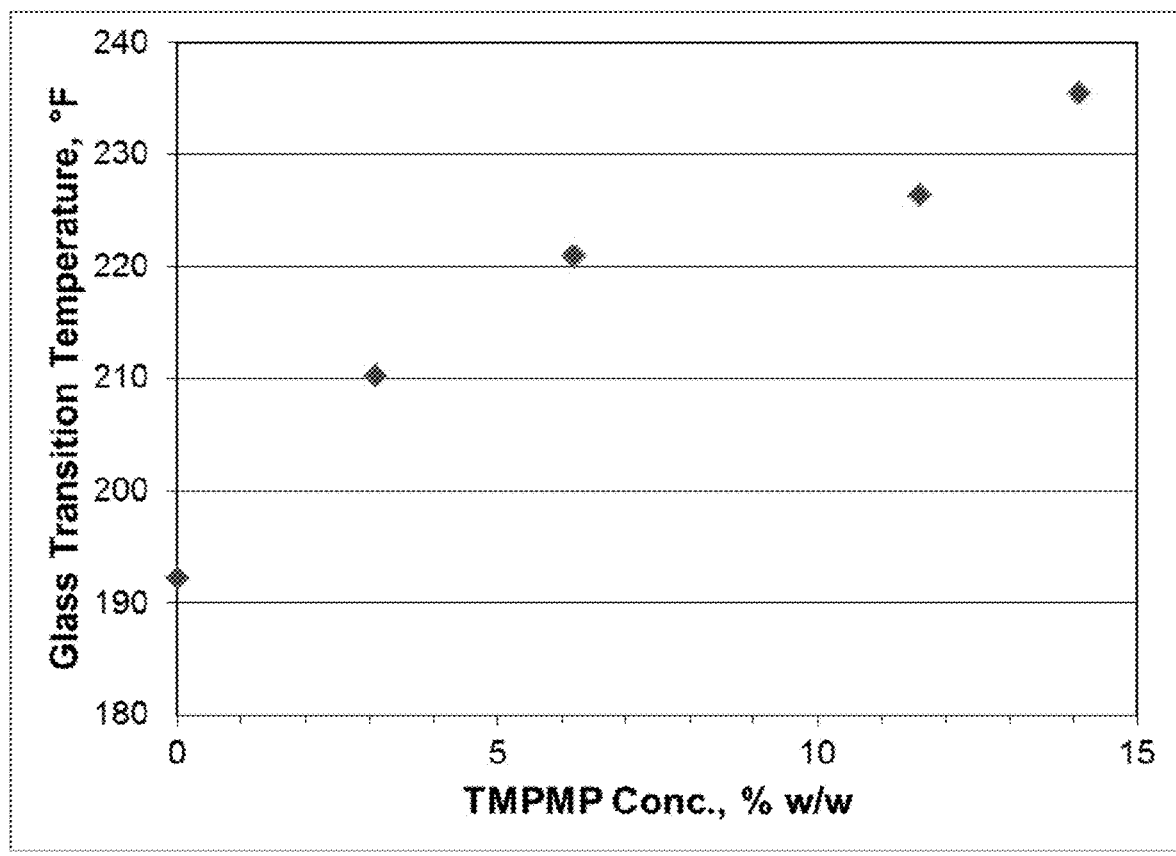
FIG. 1 shows effects of: tetramethyl 1,4-phenylenebis (methylene) diphosphonate concentration on the glass transition temperature of Epon 828-Jeffamine D-230 epoxy resin.

In order to maintain desirable mechanical properties at high temperatures, the glass transition temperature (Tg) of a cement composition made from epoxy resins should be above the application temperature. Selection of epoxy and amine hardeners to give a higher cross-link density can increase the glass transition temperature, but the hardening reaction may be too fast to allow placement in higher-temperature environments. By adding a component that reacts to form additional crosslinks after the resin cures, the stiffness and glass transition temperature of the resin are increased without shortening the pumping time. Di- or polyfunctional alkylphosphonate esters (e.g., methyl and ethyl esters) are a class of compounds that react post-cure to further crosslink the resin. The amine hardener reacts with the alkyl ester to form a quaternary ammonium ion that forms a salt with the monoalkylated phosphonate ester anion. By crosslinking through these ionic bonds, the bisphosphonate acts as a fortifier. Modulus and compressive strength are consequently improved. A representative schematic is shown below.

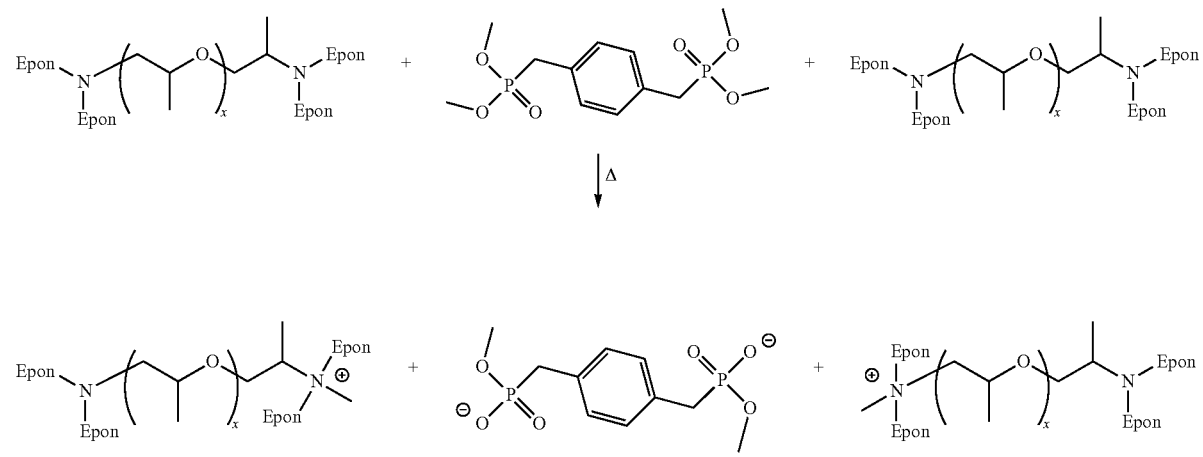

The structure for "Epon" (bisphenol A diglycidyl ether) is shown below:

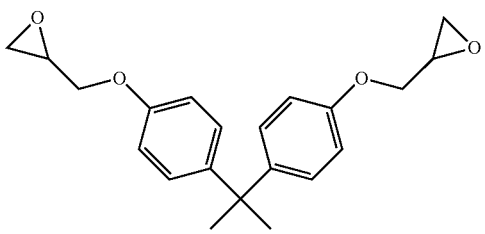 [SMILES: CC(C)(c1ccc(OCC2CO2)cc1)c1ccc(OCC2CO2)cc1]

(Epon=bisphenol A diglycidyl ether)

Accordingly, the instant disclosure relates to a composition comprising: (a) a di- or poly epoxide resin; (b) an amine hardener; and (c) a di- or polyfunctional alkylphosphonate ester fortifier. In certain embodiment, the amine hardener is not dimethyl ethylenediamine and/or ethylenediamine.

The di- or poly epoxide resin may be one or more compounds selected from the group consisting of an epichlorohydrin adduct of a bisphenol, an epichlorohydrin adduct of a novolac, an epichlorohydrin adduct of an alkyl diol, and an epichlorohydrin adduct of a cycloalkyl diol. In particular, the di- or poly epoxide resin may be one or more compounds selected from the group consisting of a bisphenol A epoxy resin, a bisphenol F epoxy resin, an epoxy novolac resin, a diglycidyl ether of an aliphatic diol, a diglycidyl ether of a polyethylene glycol, a diglycidyl ether of a polypropylene glycol, a cyclohexanedimethanol diglycidyl ether, a butanediol diglycidyl ether, trimethylolpropane triglycidyl ether, a hexanediol diglycidyl ether, N,N-diglycidyl-4-glycidyloxyaniline, 4,4'-methylenebis(N,N-diglycidylaniline), neopentyl glycol diglycidyl ether, resorcinol diglycidyl ether, tetraphenylolethane glycidyl ether, tris(2,3-epoxypropyl) isocyanurate, and tris(4-hydroxyphenyl) methane triglycidyl ether. Additionally, the di- or poly epoxide resin may be a bisphenol A diglycidyl ether and/or a cyclohexanedimethanol diglycidyl ether.

The di- or poly epoxide resin is typically in an amount of from 20 wt. % to 90 wt. %, based on the total weight of the resin-hardener mixture. The di- or poly epoxide resin may also be in amount of from 20 wt. % to 80 wt. %, 20 wt. % to 70 wt. %, 20 wt. % to 60 wt. %, 20 wt. % to 50 wt. %, or 20 wt. % to 40 wt. %, in each case based on the total weight of the composition. Likewise, the di- or poly epoxide resin may be in amount of from 30 wt. % to 90 wt. %, 40 wt. % to 90 wt. %, 50 wt. % to 90 wt. %, 60 wt. % to 90 wt. %, 70 wt. % to 90 wt. %, or 80 wt. % to 90 wt. %, in each case based on the total weight of the composition. Also, the di- or poly epoxide resin may be in amount of from 30 wt. % to 80 wt. %, 40 wt. % to 70 wt. %, or 50 wt. % to 60 wt. %, in each case based on the total weight of the composition.

The amine hardener may be one or more alkyl or aromatic di- or polyamine. In particular, the amine hardener may be one or more compounds selected from the group consisting of triethylenetetraamine, ethylenediamine, N-cocoalkyltrimethylenediamine, isophorone diamine, N-aminophenyl piperazine, imidazoline, 1,2-diaminocyclohexane, polyetheramine, polyethyleneimines, diethyltoluenediamine, 4,4'-diaminodiphenylmethane, cyclohexanebis(methylamine), 1,5-diamino-2-methylpentane, diaminononane, melamine, dimethylpropanediamine, 2,2'-(ethylenedioxy)bis(ethylamine), 4,4'-methylenebis(2-chloroaniline), 4,4'-methylenebis(cyclohexylamine), 4,4'-methylenebis(2,6-diethylaniline), 4,4'-methylenebis(2,6-dimethylaniline), dimethylthiotoluenediamine, 3,4'-oxydianiline, and a polyoxypropylenediamine. Additionally, the amine hardener may be one or more compounds selected from the group consisting of diethyltoluenediamine, dimethylthiotoluenediamine, and polyoxypropylenediamine.

The amine hardener is typically in an amount of from 5 wt. % to 75 wt. %, based on the total weight of the di- or poly epoxide resin. The amine hardener may also be in an amount of from 5 wt. % to 65 wt. %, 5 wt. % to 55 wt. %, 5 wt. % to 45 wt. % or 5 wt. % to 35 wt. %, based on the total weight of the di- or poly epoxide resin. Likewise, the amine hardener may be in an amount of from 15 wt. % to 75 wt. %, 25 wt. % to 75 wt. %, 35 wt. % to 75 wt. %, 45 wt. % to 75 wt. %, or 55 wt. % to 75 wt. %, based on the total weight of the di- or poly epoxide resin. Also, the amine hardener may be in an amount of from 10 wt. % to 60 wt. %, 15 wt. % to 50 wt. %, or 20 wt. % to 40 wt. %, based on the total weight of the epoxy resin.

The di- or polyfunctional alkylphosphonate ester fortifier is typically an ethyl or methyl ester. In particular, the di- or polyfunctional alkylphosphonate ester fortifier may be one or more compounds selected from the group consisting of:

tetra(methyl or ethyl) 1,x-$C_3$-$C_{10}$bisphosphonate, wherein x=3-10;

hexa(methyl or ethyl) 1,2,3-propanetriyltrisphosphonate;

tetra(methyl or ethyl) 1,x-phenylenebis (methylene) diphosphonate, wherein x=2-4;

tetra(methyl or ethyl) 1,x-naphthalenediylbis(methylene) diphosphonate, wherein x=2-8;

tetra(methyl or ethyl) 2,x-pyridinediylbis(methylene)diphosphonate, wherein x=3-6;

tetra(methyl or ethyl) 2,5-furandiylbis(methylene)diphosphonate;

tetra(methyl or ethyl) 3-alkyl-2,5 furandiylbis (methylene) diphosphonate; and tetra(methyl or ethyl) 3-alkyl-2,5-thiophenediylbis (methylene) diphosphonate.

Furthermore, the di- or polyfunctional alkylphosphonate ester fortifier may be one or more compounds selected from the group consisting of:

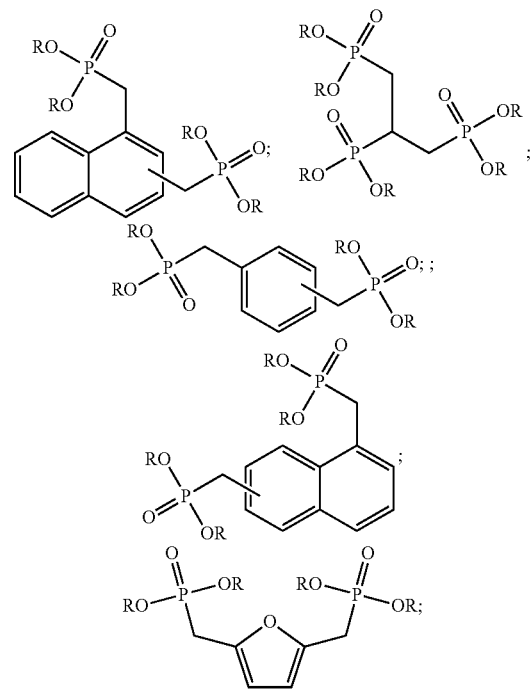

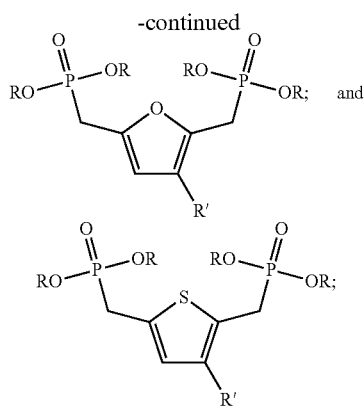

and where R is methyl or ethyl; and
R' is a $C_1$-$C_{15}$ aliphatic or branched alkyl, which may be optionally substituted.

The di- or polyfunctional alkylphosphonate ester fortifier is typically in an amount of from 0.1 wt. % to 40 wt. %, 0.1 wt. % to 30 wt. %, 0.1 wt. % to 20 wt. %, or 0.1 wt. % to 15 wt. %. The di- or polyfunctional alkylphosphonate ester fortifier may also be in an amount of from 0.5 wt. % to 35 wt. %, 1 wt. % to 25 wt. %, or 5 wt. % to 15 wt. % in the resin-hardener mixture. In particular, the amount of the di- or polyfunctional alkylphosphonate ester fortifier is in an amount sufficient to increase the glass transition temperature, or react post-cure to further crosslink the compositions of the instant disclosure.

The composition of the instant disclosure are unique in that the di- or polyfunctional alkylphosphonate ester fortifier may increase the glass transition temperature of the fully cured composition relative to the glass transition temperature of an otherwise identical composition without the one or more di- or polyfunctional alkylphosphonate ester fortifiers.

The compositions of the instant disclosure may also include one or more density modifiers and/or filler particles. In some instances the density modifiers and filler particles are the same. In other instances, however, the filler particles have the same density as the resin and would therefore not modify the density, i.e., are not the same as a density modifier. Density modifiers can be used to modify the density of the composition and filler particles can be used for altering the mechanical properties of the resin, or as replacement ingredients for other components of the composition.

The density modifiers and/or filler particles are typically one or more compounds selected from the group consisting of aluminum oxide, awaruite, barium carbonate, barium oxide, barite, calcium carbonate, chromite, chromium oxide, copper, copper oxide, dolomite, galena, hematite, hollow glass microspheres, ilmenite, iron oxide, siderite, magnetite, magnesium oxide, manganese carbonate, manganese dioxide, manganese(IV) oxide, manganese oxide, manganese tetraoxide, manganese(II) oxide, manganese(III) oxide, molybdenum(IV) oxide, molybdenum oxide, molybdenum trioxide, Portland cement, pumice, pyrite, sand, fly ash cenospheres, silica, tenorite, titania, titanium(II) oxide, titanium(III) oxide, titanium(IV) oxide, zirconium oxide, zirconium silicate, zinc oxide, cement-kiln dust, unexpanded and expanded perlite, attapulgite, bentonite, zeolite, and elastomers.

The density modifier and/or filler particles are typically in an amount of from 0.1 wt. % to 75 wt. %, based on the total weight of the composition. The density modifier and/or filler particles may also be in an amount of from 0.1 wt. % to 45 wt. %, or 0.1 wt. % to 40 wt. %, in each case based on the total weight of the composition. Likewise, the density modifier and/or filler particles may be in an amount of from 1.0 wt. % to 50 wt. %, 5 wt. % to 45 wt. % or from 10 wt. % to 40 wt. %, in each case based on the total weight of the composition.

The compositions of the instant disclosure may also include one or more silane coupling agents. For example, the silane coupling agents may be one or more compounds selected from the group consisting of N-(2-aminoethyl)-3-aminopropyltrimethoxysilane, 3-aminopropyltriethoxysilane, (3-trimethoxysilylpropyl)diethylenetriamine, 3-ureidopropyltriethoxysilane, 2-(3,4-epoxycyclohexyl)ethyltrimethoxysilane, (3-glycidoxypropyl)trimethoxysilane, vinyltrichlorosilane, vinyltris(2-methoxyethoxy)silane, vinyltriethoxysilane, vinyltrimethoxysilane, 3-methacryloxypropyltrimethoxysilane, 2-(3,4-epoxycyclohexyl)ethyltriethoxysilane, (3-glycidoxypropyl)trimethoxysilane, (3-glycidoxypropyl)methyldiethoxysilane, N-(2-aminoethyl)-3-aminopropylmethyldimethoxysilane, 3-aminopropyltrimethoxysilane, N-phenyl-(3-aminopropyl)trimethoxysilane, 3-mercaptopropyltrimethoxysilane, 3-chloropropyltrimethoxysilane, bis(triethoxysilylpropyl)amine, and bis(trimethoxysilylpropyl)amine.

The one or more silane coupling agents is typically in an amount of from 0.1 wt. % to 15 wt. %, based on the total weight of the composition. Also, the silane coupling agent(s) may be in an amount of from 0.1 wt. % to 12 wt. %, 0.1 wt. % to 10 wt. %, 0.1 wt. % to 8 wt. %, 0.1 wt. % to 6 wt. %, 0.1 wt. % to 5 wt. %. 0.1 wt. % to 4 wt. %, 0.1 wt. % to 3 wt. %, 0.1 wt. % to 2 wt. %, or 0.1 wt. % to 1 wt. %, in each case based on the total weight of the composition. Likewise, the silane coupling agent may be in an amount of from 0.2 wt. % to 10 wt. %, 0.3 wt. % to 5 wt. %, 0.4 wt. % to 4 wt. %, or 0.5 wt. % to 2 wt. %, in each case based on the total weight of the resin-hardener mixture.

The compositions of the instant disclosure may also include one or more diluents. The diluent is typically one or more compounds selected from the group consisting of an aromatic naphtha solvent, a polyethylene glycol, butyl lactate, butyl glycidyl ether, phenyl glycidyl ether, a cresyl glycidyl ether, a dipropylene glycol methyl ether, a dipropylene glycol dimethyl ether, isophorone, dimethylformamide, diethyleneglycol methyl ether, ethylene glycol butyl ether, diethylene glycol butyl ether, a propylene carbonate, d-limonene, a fatty acid methyl ester, and 2-ethylhexyl glycidyl ether.

The diluent is typically in an amount of from 1 wt. % to 50 wt. %, based on the total weight of the resin-hardener mixture. The diluent may also be in an amount of from 1 wt. % to 45 wt. %, 1 wt. % to 40 wt. %, 1 wt. % to 35 wt. %, 1 wt. % to 30 wt. %, 1 wt. % to 25 wt. %, or 1 wt. % to 20 wt. %, in each case based on the total weight of the composition. Likewise, the diluent may be in an amount of from 2 wt. % to 40 wt. %, 3 wt. % to 30 wt. % or 5 wt. % to 20 wt. %, in each case based on the total weight of the composition.

In one embodiment, the instant disclosure relates to a composition comprising:
(a) 30 wt. % to 90 wt. %, based on the total weight of the composition, of a bisphenol A diglycidyl ether resin and/or a cyclohexanedimethanol diglycidyl ether;
(b) 1 wt. % to 50 wt. %, based on the total weight of component (a), of one or more amine hardeners selected from the group consisting of diethyltoluenediamine, dimethylthiotoluenediamine, and polyoxypropylenediamine;

(c) 0.1 wt. % to 35 wt. %, based on the total weight of the composition, of one or more di- or polyfunctional alkylphosphonate esters selected from the group consisting of:

tetra(methyl or ethyl) 1,x-$C_3$-$C_{10}$bisphosphonate, wherein x=3-10;

hexa(methyl or ethyl) 1,2,3-propanetriyltrisphosphonate;

tetra(methyl or ethyl) 1,x-phenylenebis(methylene)diphosphonate, wherein x=2-4;

tetra(methyl or ethyl) 1,x-naphthalenediylbis(methylene) diphosphonate, wherein x=2-8;

tetra(methyl or ethyl) 2,x-pyridinediylbis(methylene)diphosphonate, wherein x=3-6;

tetra(methyl or ethyl) 2,5-furandiylbis(methylene)diphosphonate;

tetra(methyl or ethyl) 3-alkyl-2,5-furandiylbis(methylene)diphosphonate; and tetra(methyl or ethyl) 3-alkyl-2,5-thiophenediylbis(methylene)diphosphonate;

(d) optionally a density modifier or filler particles;

(e) optionally a silane coupling agent; and (f) optionally a diluent.

In another embodiment, the instant disclosure relates to methods of cementing in a subterranean zone, which may be penetrated by a well bore. Such methods may comprise, for example: (a) providing a composition according to the instant disclosure; (b) placing the composition in the subterranean zone; and (c) allowing the composition to fully cure. The method may entail mixing the composition using mixing equipment and placing the compositions in the subterranean zone, for example, by using pumping equipment.

In some instances, the method further comprises subjecting the composition of the instant disclosure to a circulating temperature that is typically from 40° F. to 300° F. and a static temperature that is typically from 40° F. to 350° F. The "circulating temperature" is the temperature of the composition while being pumped or transported into place, and the "static temperature" is the temperature of the composition after it arrives at its final destination and is being fully cured. The circulating temperature may also be from 50° F. to 250° F. or 60° F. to 200° F. The static temperature may also be from and the static temperature from 50° F. to 300° F. or 60° F. to 250° F. Typically, the static temperature will be higher than the circulating temperature.

The compositions of the instant disclosure typically have a viscosity of from 5 Bc to 100 Bc while being pumped into the subterranean zone. The term "Bc" stands for Bearden units of consistency, which can be determined with a consistometer. In some instances, the composition will have a viscosity of from 10 Bc to 90 Bc, or from 10 Bc to 70 Bc; or a viscosity of not more than 100 Bc, not more than 90 Bc, not more than 80 Bc, not more than 70 Bc, not more than 60 Bc, or not more than 50 Bc.

Typically, the di- or polyfunctional alkylphosphonate ester fortifiers do not substantially increase the viscosity of the composition during pumping or transport. Use of the term "substantially" is intended to indicate that the viscosity is not changed by more than 20% relative to an otherwise identical composition without the di- or polyfunctional alkylphosphonate ester fortifier. Likewise, in some cases, the di- or polyfunctional alkylphosphonate ester fortifier will not increase the viscosity more than 5%, 4%, 3%, 2%, or 1%, relative to an otherwise identical composition without the di- or polyfunctional alkylphosphonate ester fortifier.

The instant disclosure also relates to methods of increasing the glass transition temperature of a cured cement, plug, or seal used in a subterranean zone, optionally penetrated by a well bore. In some cases, the glass transition temperature is increased by 1 to 50° F. For example, the glass transition temperature may be increased by at least 5, 10, 15, 20, 25, 30, 35, 40, or 45° F. up to 50° F., relative to an otherwise identical composition without the di- or polyfunctional alkylphosphonate ester fortifier. Typically, the method comprises:

(a) dissolving a di- or polyfunctional alkylphosphonate ester fortifier in a di- or poly epoxide resin;

(b) adding an amine hardener to the di- or poly epoxide resin having the di- or polyfunctional alkylphosphonate ester fortifier dissolved therein to form a uncured composition;

(c) pumping the uncured composition into a subterranean zone penetrated by a well bore; and (d) allowing the uncured composition to cure and form a cured cement, plug, or seal having a $T_g$ higher than an otherwise identical cured cement, plug, or seal formed without addition of the di- or polyfunctional alkylphosphonate ester fortifier.

The exemplary cementing compositions disclosed herein may directly or indirectly affect one or more components or pieces of equipment associated with the preparation, delivery, recapture, recycling, reuse, and/or disposal of the disclosed cementing compositions. For example, the disclosed cementing compositions may directly or indirectly affect one or more mixers, related mixing equipment, mud pits, storage facilities or units, composition separators, heat exchangers, sensors, gauges, pumps, compressors, and the like used generate, store, monitor, regulate, and/or recondition the exemplary cementing compositions. The disclosed cementing compositions may also directly or indirectly affect any transport or delivery equipment used to convey the cementing compositions to a well site or downhole such as, for example, any transport vessels, conduits, pipelines, trucks, tubulars, and/or pipes used to compositionically move the cementing compositions from one location to another, any pumps, compressors, or motors (e.g., topside or downhole) used to drive the cementing compositions into motion, any valves or related joints used to regulate the pressure or flow rate of the cementing compositions, and any sensors (i.e., pressure and temperature), gauges, and/or combinations thereof, and the like. The disclosed cementing compositions may also directly or indirectly affect the various downhole equipment and tools that may come into contact with the cement compositions/additives such as, but not limited to, wellbore casing, wellbore liner, completion string, insert strings, drill string, coiled tubing, slickline, wireline, drill pipe, drill collars, mud motors, downhole motors and/or pumps, cement pumps, surface-mounted motors and/or pumps, centralizers, turbolizers, scratchers, floats (e.g., shoes, collars, valves, etc.), logging tools and related telemetry equipment, actuators (e.g., electromechanical devices, hydromechanical devices, etc.), sliding sleeves, production sleeves, plugs, screens, filters, flow control devices (e.g., inflow control devices, autonomous inflow control devices, outflow control devices, etc.), couplings (e.g., electro-hydraulic wet connect, dry connect, inductive coupler, etc.), control lines (e.g., electrical, fiber optic, hydraulic, etc.), surveillance lines, drill bits and reamers, sensors or distributed sensors, downhole heat exchangers, valves and corresponding actuation devices, tool seals, packers, cement plugs, bridge plugs, and other wellbore isolation devices, or components, and the like.

The terms "comprising," "having," and "including" are used in their open, non-limiting sense.

The terms "a," "an," and "the" are understood to encompass the plural as well as the singular.

The expression "at least one" means one or more and thus includes an individual component as well as mixtures/combinations.

To facilitate a better understanding of the present invention, the following examples of certain embodiments are given. In no way should the following examples be read to limit, or define, the scope of the invention.

Example 1

Synthesis of tetramethyl 1,4-phenylenebis(methylene)diphosphonate

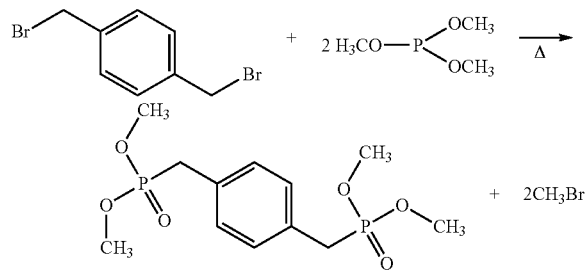

A 25 ml round bottom flask was charged with 5.60 g (45.1 mmol) trimethyl phosphite and 5.000 g (18.9 mmol) 1,4-bis(bromomethyl)benzene. The flask was fitted with a reflux condenser and calcium chloride drying tube. The flask was stirred magnetically and heated in an oil bath. At a bath temperature of 96° C., vigorous boiling commenced as the 1,4-bis(bromomethyl)benzene dissolved. The initially colorless solution gradually developed a yellow color. After the boiling subsided, the bath temperature was increased to 130° C. and maintained at that temperature for 4 hours. The flask was cooled to ambient temperature.

The solution was yellow and contained a small amount of brown precipitate. The flask was fitted with a distillation head, condenser, vacuum adapter, and receiving flask. The excess trimethyl phosphite and dimethyl methylphosphonate by-product were removed by vacuum distillation with a maximum oil-bath temperature of 130° C. Vigorous boiling occurred before heating was started, which may have been due to the presence of methyl bromide in the solution. A small amount of clear, colorless liquid was collected in the receiving flask. The crude product slowly crystallized after cooling to ambient temperature. Crude product: 5.482 g (90.0% crude yield) of yellow, waxy solid.

The crude product was dissolved in tetrahydrofuran, filtered through a 0.45μ PTFE syringe filter, and recrystallized. The product was collected on a Büchner funnel, rinsed with cold tetrahydrofuran, and air dried. Final product: 3.0666 g (50.4% overall yield) of white solid.

Example 2

Preparation of Resin Samples for Determination of Glass-Transition Temperature

A total of five, 1 dram vials were charged with bisphenol A diglycidyl ether (Epon 828) and tetramethyl 1,4-pheneylenebis(methylene)diphosphonate ("TMPMP"). The vials were warmed in a 50° C. oil bath and stirred to dissolve the phosphonate ester. A small amount of the TMPMP remained undissolved in each sample where it was added. Polyoxypropylenediamine (Jeffamine D-230) was added and the mixture was stirred to mix thoroughly. The contents of the five samples is presented in Table 1 below.

TABLE 1

Composition of Epoxy Resin Samples

| Sample No. | P/N Mole Ratio | Epon 828 (g) | TMPMP (g) | Jeffamine D-230 (g) |
|---|---|---|---|---|
| 1 | 0 | 2.0011 | 0 | 0.6098 |
| 2 | 0.1 | 2.0004 | 0.0847 | 0.6099 |
| 3 | 0.2 | 1.9998 | 0.1716 | 0.6100 |
| 4 | 0.4 | 2.0006 | 0.3426 | 0.6100 |
| 5 | 0.5 | 1.9999 | 0.4274 | 0.6102 |

DSC pans were charged with the samples, as indicated Table 2.

TABLE 2

Sample Quantities for DSC Measurement

| Sample No. | Resin Mixture (mg) |
|---|---|
| 1 | 70.1 |
| 2 | 61.4 |
| 3 | 66.9 |
| 4 | 65.1 |
| 5 | 65.7 |

The pans and the remaining resin samples were cured in an oven at 122° F. for 2.25 hours. The oven temperature was then increased to 230° F. for 87 hours. The cured samples were clear yellow with no evidence of undissolved solid. The results for the samples in high-volume DSC pans are shown in FIG. 1.

Example 3

Mechanical Testing

Resin was prepared by mixing Epon 828 (bisphenol A diglycidyl ether) with Jeffamine D-230 (polyoxypropylenediamine, MW 230) in a ratio of 3.28 g of Epon 828/g of Jeffamine D-230. Where noted, silica flour was added (0.655 g/g of resin mixture) to make a composite material.

Control:

Unfilled resin (Sample #1): 22.9906 g (0.0610 mol) Epon 828 was mixed with 7.0100 g (0.0305 mol) Jeffamine D-230. A 0.625 in diameter cylindrical mould was filled with the resin.

Resin composite (Sample #2): 15.2733 g of the remaining unfilled control resin was mixed with 10.0044 g silica flour (7 μm average particle size).

The mixture was warmed to 50° C. to facilitate removal of the entrained air, and remixed before filling a 0.625 in diameter cylindrical mould.

Fortified Resin:

Unfilled resin (Sample #3): 1.9673 g tetramethyl 1,4-phenylenebis(methylene)diphosphonate was dissolved in 22.9235 g (0.0608 mol) Epon 828 with stirring while heating in a 50° F. oil bath. A few undissolved particles remained. 6.9901 g (0.0304 mol) of Jeffamine D-230 was mixed with the Epon-phosphonate ester solution. A 0.625 in diameter cylindrical mould was filled with the fortified resin.

Fortified resin composite (Sample #4): 15.9826 g of the remaining fortified resin was mixed with 10.4685 g silica flour. The mixture was warmed to 50° C. to facilitate removal of the entrained air, and remixed before filling a 0.625 in diameter cylindrical mould.

The samples were heated in a 122° F. oven for 2 hours and 45 minutes. The temperature was then increased to 230° F. and held for 87 hours. The samples were removed from the moulds, cooled to ambient temperature, and trimmed to a length of approximately 1.25 inches.

To test the mechanical properties, the samples were trimmed to a length of approximately two times the diameter. The samples were preheated in the environmental chamber of an Instron load frame at a temperature of 100° C. for 1 hour. The samples were measured (length and diameter) and tested at a temperature of 100° C. Samples were compressed at a rate of 0.06 in/min to a maximum of 40% strain. Modulus was calculated from the low-strain, linear region of the stress-strain curve. The results are presented in Table 3, below.

TABLE 3

Mechanical Properties

| Sample No. | Modulus, psi | Strain range for modulus calculation | Linear regression of strain range, $R^2$ | Maximum stress, psi | Strain at maximum stress |
|---|---|---|---|---|---|
| 1 | 2810 | 0.015–0.05 | 0.9997 | 2450 | 0.400 |
| 2 | 4370 | 0.01–0.03 | 0.9997 | 2080 | 0.271 |
| 3 | 55,700 | 0.002–0.0027 | 0.9994 | 7360 | 0.400 |
| 4 | 39,800 | 0.0015–0.0023 | 0.9964 | 4950 | 0.323 |

Figure 2:
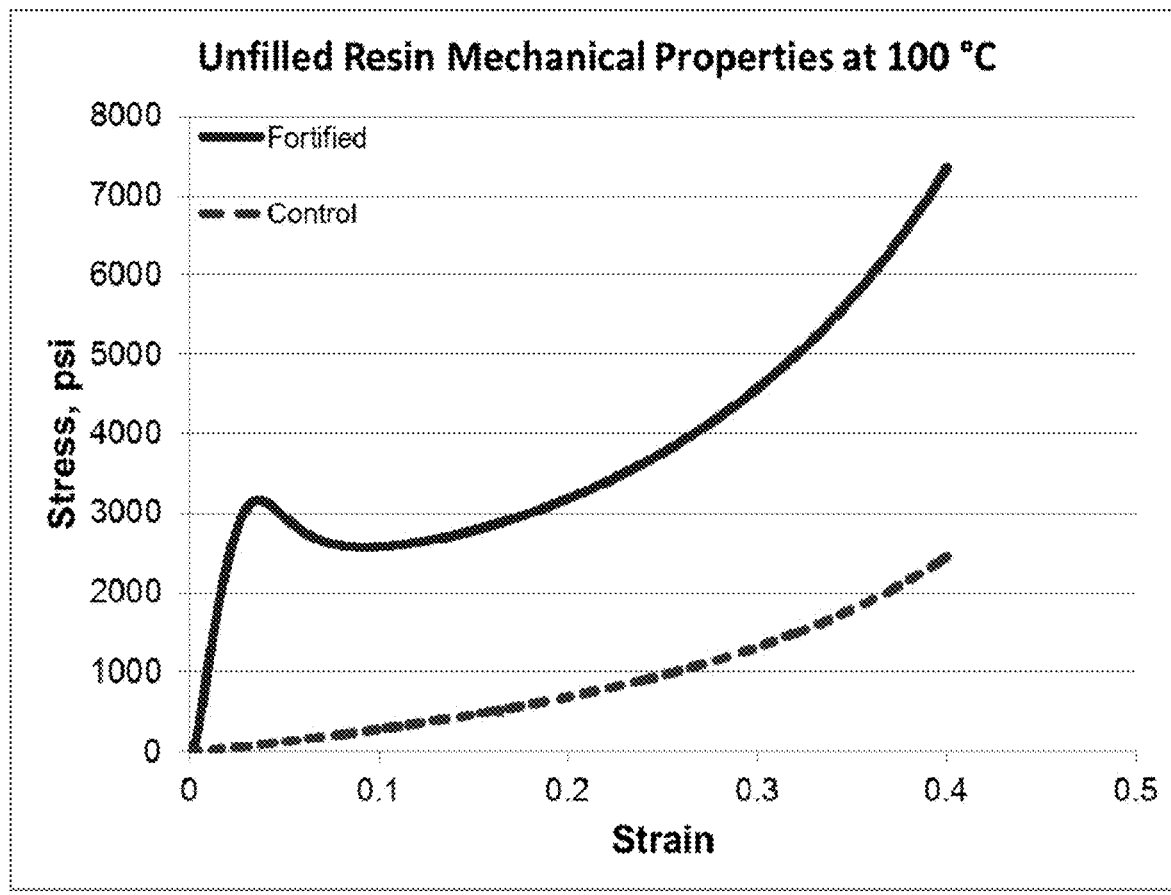
FIG. 2 shows a stress-strain plot of unfilled resin with and without 1,4-phenylenebis(methylene)diphosphonate at 100° C.
Figure 3:
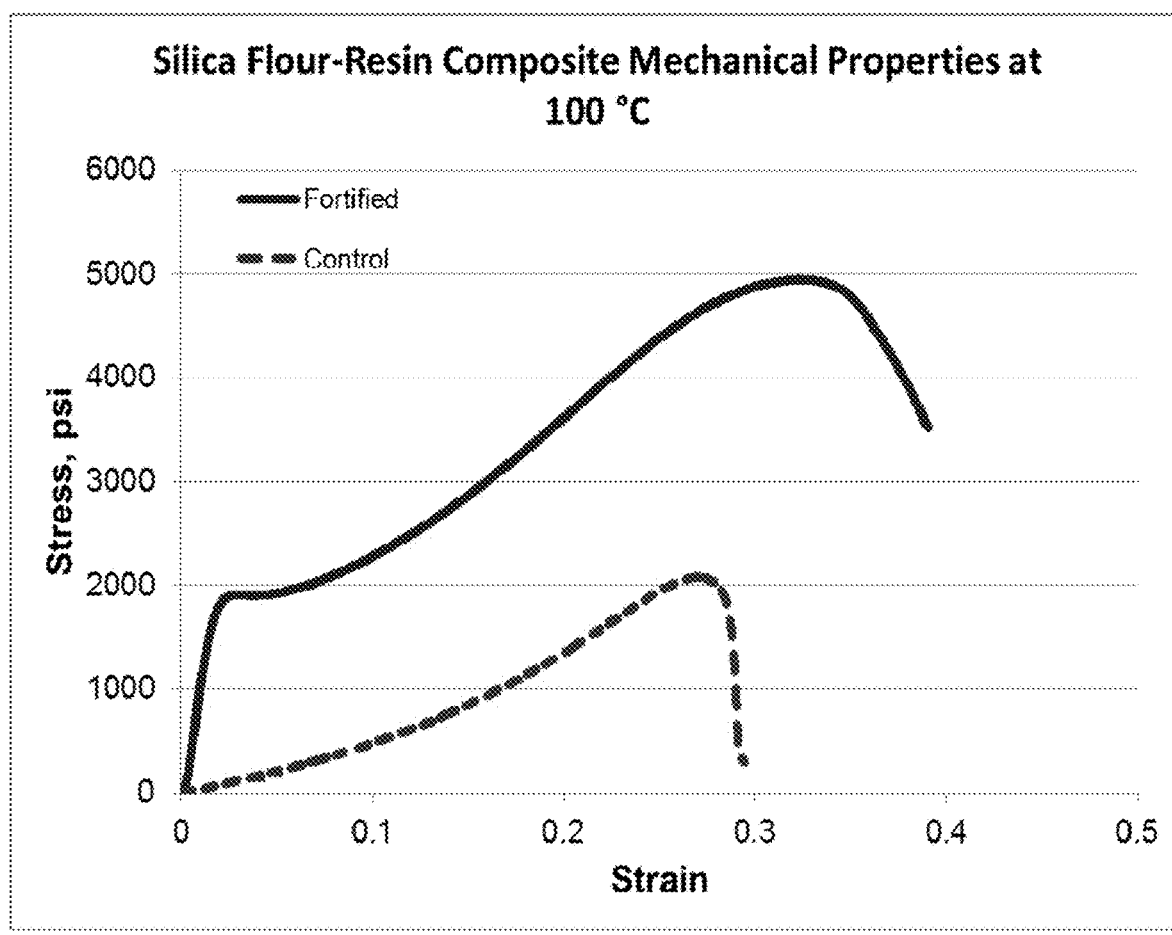
FIG. 3 shows a stress-strain plot of resin-silica flour composite with and without tetramethyl 1,4-phenylenebis (methylene)diphosphonate at 100° C.

The above results are presented graphically in FIGS. 2 and 3. FIG. 2 graphically compares the stress versus strain of the unfilled resins (Formulations #1 and #3) at 100° C. FIG. 3 graphically compares the stress versus strain of the filled resins (Formulations #2 and #4) at 100° C.

The foregoing descriptions of specific compositions and methods of the present invention have been presented for purposes of illustration and description. They are not intended to be exhaustive or to limit the invention to the precise compositions and methods disclosed and obviously many modifications and variations are possible in light of the above teaching. The embodiments were chosen and described in order to best explain the principles of the invention and its practical application, to thereby enable others skilled in the art to best utilize the invention with various modifications as are suited to the particular use contemplated. It is intended that the scope of the invention be defined by the claims appended hereto and their equivalents.

The invention claimed is:

1. An epoxide resin cementing composition for use in a subterranean well, the composition comprising:
    (a) a di- or poly epoxide resin;
    (b) polyoxypropylenediamine, wherein the polyoxypropylenediamine is present from 5 wt % to 15 wt % based on the total weight of the composition; and
    (c) a di- or polyfunctional alkylphosphonate ester fortifier, wherein the fortifier is present from 3 wt % to 15 wt % based on the total weight of the composition;
    wherein the di- or polyfunctional alkylphosphonate ester is one or more compounds selected from the group consisting of:
        hexa(methyl or ethyl) 1,2,3-propanetriyltrisphosphonate;
        tetra(methyl or ethyl) 1,x-phenylenebis(methylene)diphosphonate, wherein x=2-4;
        tetra(methyl or ethyl) 1,x-naphthalenediylbis(methylene)diphosphonate, wherein x=2-8;
        tetra(methyl or ethyl) 2,x-pyridinediylbis(methylene) diphosphonate, wherein x=3-6;
        tetra(methyl or ethyl) 2,5-furandiylbis(methylene)diphosphonate;
        tetra(methyl or ethyl) 3-alkyl-2,5-furandiylbis (methylene) diphosphonate; and
        tetra(methyl or ethyl) 3-alkyl-2,5-thiophenediylbis (methylene) diphosphonate
    (d) a density modifier;
        wherein the glass transition temperature of the composition is increased by the presence of the fortifier from 15° F. to 50° F. compared to the identical composition without the fortifier, and
        wherein the composition has a viscosity of at least 5 Bc to 90 Bc prior to curing, and
        wherein the composition does not comprise any Portland cement.

2. The composition according to claim 1, wherein
    (a) the di- or poly epoxide resin is one or more compounds selected from the group consisting of an epichlorohydrin adduct of a bisphenol, an epichlorohydrin adduct of a novolac, an epichlorohydrin adduct of an alkyl diol, and an epichlorohydrin adduct of a cycloalkyl diol.

3. The composition according to claim 2, wherein
    (a) the di- or poly epoxide resin is one or more compounds selected from the group consisting of a bisphenol A epoxy resin, a bisphenol F epoxy resin, an epoxy novolac resin, a diglycidyl ether of an aliphatic diol, a diglycidyl ether of a polyethylene glycol, a diglycidyl ether of a polypropylene glycol, a cyclohexanedimethanol diglycidyl ether, a butanediol diglycidyl ether, trimethylolpropane triglycidyl ether, a hexanediol diglycidyl ether, N,N-diglycidyl-4-glycidyloxyaniline, 4,4'-methylenebis(N,N-diglycidylaniline), neopentyl glycol diglycidyl ether, resorcinol diglycidyl ether, tetraphenylolethane glycidyl ether, tris(2,3-epoxypropyl) isocyanurate, and tris(4-hydroxyphenyl)methane triglycidyl ether.

4. The composition according to claim 3, wherein
    (a) the di- or poly epoxide resin is a bisphenol A diglycidyl ether resin and/or a cyclohexanedimethanol diglycidyl ether.

5. The composition according to claim 1, wherein the di- or polyfunctional alkylphosphonate ester fortifier is an ethyl or methyl ester.

6. The composition according to claim 1, wherein the di- or polyfunctional alkyl phosphonate ester is one or more compounds selected from the group consisting of:

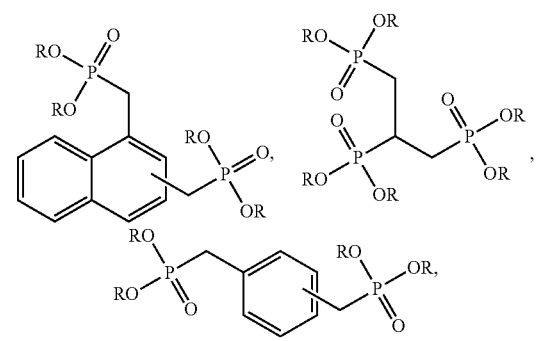

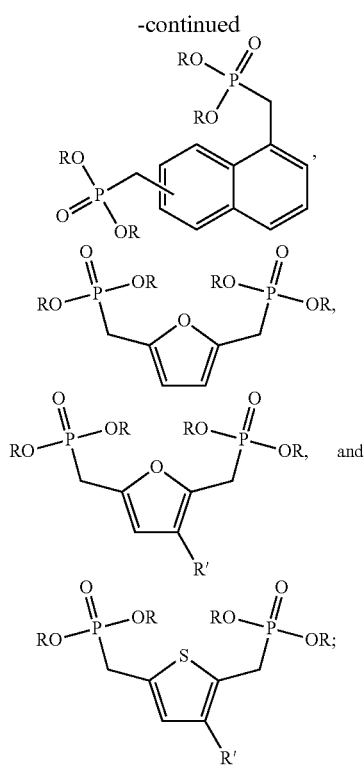

wherein R is methyl or ethyl; and

R' is a $C_1$-$C_{15}$ aliphatic or branched alkyl, which may be optionally substituted.

7. The composition according to claim 1, where (a) the di- or poly epoxide resin is in an amount of from 20 wt. % to 90 wt. %, based on the total weight of the composition.

8. The composition according to claim 1, wherein (b) the amine hardener is in an amount of from 5 wt. % to 75 wt. %, based on the total weight of the epoxy resin.

9. The composition according to claim 1, wherein the density modifier is barite.

10. The composition according to claim 1, further comprising:

(e) a silane coupling agent, and (f) a diluent.

11. An epoxide resin cement composition for use in a subterranean well, the composition comprising:

(a) 30 wt. % to 90 wt. %, based on the total weight of the composition, of a bisphenol A diglycidyl ether resin and/or a cyclohexanedimethanol diglycidyl ether;

(b) 5 wt. % to 15 wt. %, based on the total weight of component (a), of polyoxypropylenediamine;

(c) 3 wt % to 15 wt % based on the total weight of the composition, of one or more di- or polyfunctional alkylphosphonate esters selected from the group consisting of:

hexa(methyl or ethyl) 1,2,3-propanetriyltrisphosphonate;

tetra(methyl or ethyl) 1,x-phenylenebis(methylene)diphosphonate, wherein x=2-4;

tetra(methyl or ethyl) 1,x-naphthalenediylbis(methylene)diphosphonate, wherein x=2-8;

tetra(methyl or ethyl) 2,x-pyridinediylbis(methylene) diphosphonate, wherein x=3-6;

tetra(methyl or ethyl) 2,5-furandiylbis(methylene)diphosphonate;

tetra(methyl or ethyl) 3-alkyl-2,5-furandiylbis(methylene)diphosphonate; and tetra(methyl or ethyl) 3-alkyl-2,5-thiophenediylbis (methylene)diphosphonate;

(d) a density modifier;

(e) optionally a silane coupling agent; and (f) optionally a diluent, wherein the glass transition temperature of the composition is increased by the presence of the fortifier from 15° F. to 50° F. compared to the identical composition without the fortifier, and wherein the composition has a viscosity of at least 5 Bc to 90 Bc prior to curing, and wherein the composition does not comprise any Portland cement.

12. A system for cementing in a subterranean zone penetrated by a well bore comprising:

mixing equipment in which cement comprising a composition according to claim 1 is mixed; and pumping equipment by which the mixed cement is placed in the subterranean zone.

13. A method of cementing in a subterranean zone penetrated by a well bore comprising:

(a) providing a composition according to claim 1;

(b) placing the composition in the subterranean zone using pumping equipment; and (c) allowing the composition to fully cure.

14. A method of increasing the $T_g$ of a cured cement, plug, or seal used in a subterranean zone penetrated by a well bore comprising:

(a) dissolving a di- or polyfunctional alkylphosphonate ester fortifier in a di- or poly epoxide resin;

(b) adding polyoxypropylenediamine to the di- or poly epoxide resin having the di- or polyfunctional alkylphosphonate ester fortifier dissolved therein to form an uncured composition, wherein the polyoxypropylenediamine is present from 5 wt % to 15 wt % based on the total weight of the composition;

(c) pumping the uncured composition into a subterranean zone penetrated by a well bore; and (d) allowing the uncured composition to cure and form a cured cement, plug, or seal having a $T_g$ higher than an otherwise identical cured cement, plug, or seal formed without addition of the di- or polyfunctional alkylphosphonate ester fortifier.

* * * * *